UNITED STATES PATENT OFFICE.

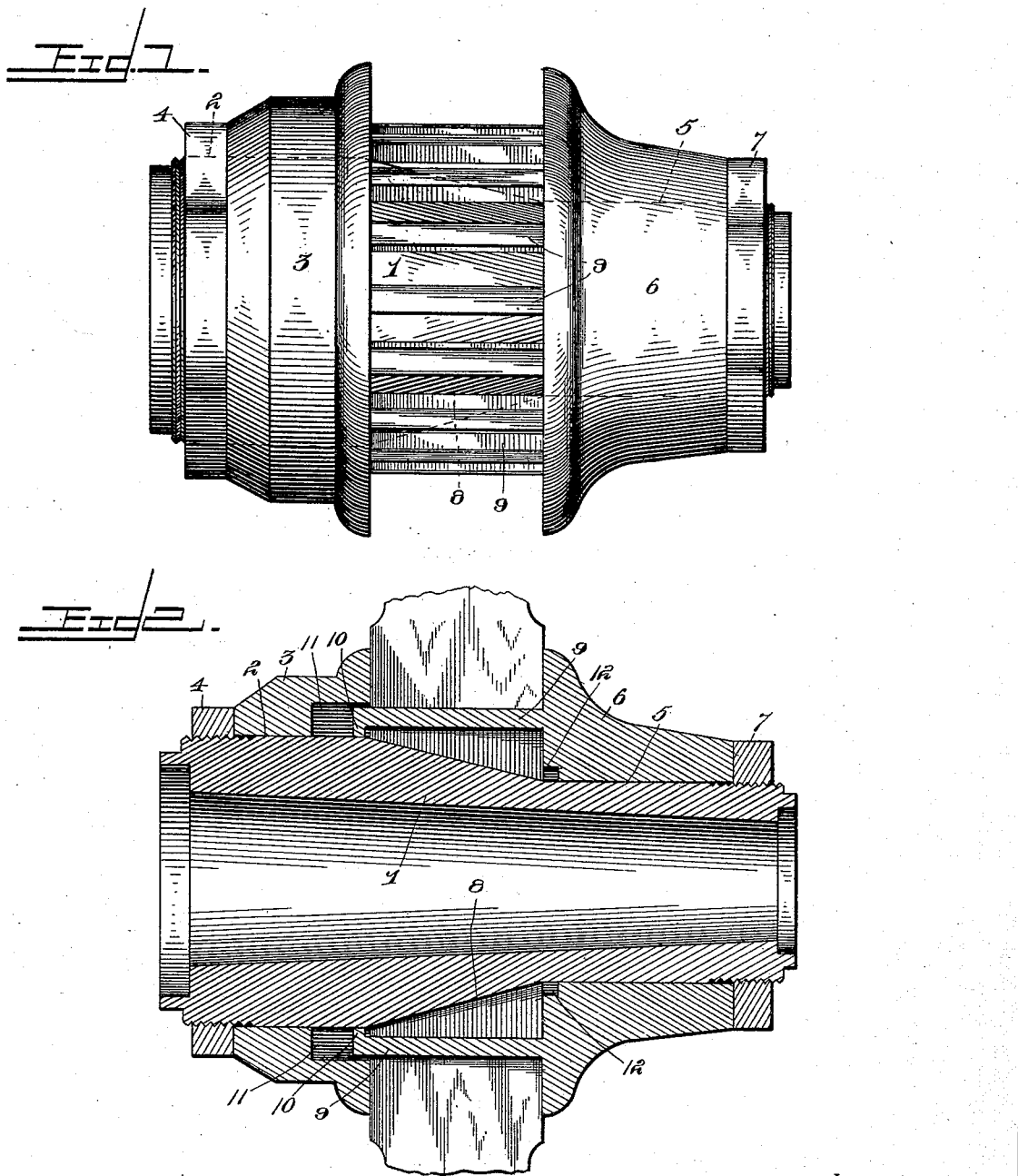

GUY SHERMAN, OF LAWRENCE, KANSAS.

WHEEL-HUB.

SPECIFICATION forming part of Letters Patent No. 572,618, dated December 8, 1896.

Application filed June 25, 1896. Serial No. 596,965. (No model.)

*To all whom it may concern:*

Be it known that I, GUY SHERMAN, a citizen of the United States, residing at Lawrence, in the county of Douglas and State of Kansas, have invented a new and useful Wheel-Hub, of which the following is a specification.

This invention relates to wheel-hubs, and the object in view is to provide a hub of simple and cheap construction in which provision is made for tightening the spokes and forcing the same outward radially for expanding the felly, thus effecting not only the tightening of the spokes, but a firm and close engagement between the felly and tire, and avoiding the expense of having the tire shrunk.

With the above object in view the invention consists in a wheel-hub embodying novel features and details of construction and arrangement of parts, as hereinafter described, illustrated in the drawings, and claimed.

In the drawings, Figure 1 is a plan view of a wheel-hub constructed in accordance with this invention. Fig. 2 is a central longitudinal section through the same.

Similar numerals of reference designate corresponding parts in both figures of the drawings.

In the drawings, 1 designates the main body of the wheel-hub, having a tapering bore for the axle-spindle. For the purpose of carrying out the present invention the outer surface of the hub 1 embodies three distinct seats for the remaining portions of the hub and the spokes. At the inner end the hub 1 has a cylindrical seat 2, surrounding which is a sleeve 3, capable of a limited longitudinal sliding movement thereon and backed by an adjusting-nut 4, which screws upon the threaded inner end of the hub.

At the outer end the hub is provided with another cylindrical seat, 5, of materially less diameter than the seat 2, and surrounding the seat 5 is a clamp-collar 6, outside of which is arranged an adjusting-nut 7, which screws upon the threaded outer end of the hub, as shown. The central portion of the hub is exteriorly tapered to form a conico cylindrical seat 8, against which the butt-ends of the spokes are adapted to rest. The clamp-collar 6 is provided upon its inner side with a circular series of longitudinally-extending webs 9, which at their extremities have inturned portions 10, forming rests which contact with and slide upon the cylindrical seat 2. The sleeve 3 is provided in that face adjacent to the clamp-collar 6 with an annular recess 11, into which the ends of the webs 9 move in the operation of clamping the spokes between the sleeve and clamp-collar. The clamp-collar 6 is provided with a similar but smaller recess 12 to admit of the necessary amount of adjustment of such collar on the seat 5.

Should the spokes of the wheel become loose, the nut 7 is screwed inward, thus advancing the clamp-collar in the same direction and forcing the butt-ends of the spokes toward the inner end of the hub and upward on the conico cylindrical seat. In this movement the spokes are spread radially, thus effecting a tightening of the same and also causing the spreading of the felly and the consequent tightening of the tire. The webs 9 maintain the proper distance between the butt-ends of the spokes and materially assist in the primary setting up of the wheel.

From the foregoing description it is seen that the device is extremely simple in construction and operation. The angle of the intermediate tapering seat may be varied to suit the manufacturer, and other changes in the form, proportion, and the minor details of construction may be resorted to without departing from the principle or sacrificing any of the advantages of this invention.

Having thus described the invention, what is claimed, and desired to be secured by Letters Patent, is—

An axle-box threaded at each end and having intermediate its ends, a conicocylindrical seat and also provided at each side of said seat with cylindrical portions of different diameters, in combination with a slide-collar surrounding the smaller cylindrical portion of the box at one side of the seat and provided with longitudinally-extending webs the extremities of which bear upon the larger cylindrical portion of the box, an opposing slide-collar surrounding the larger cylindrical portion of the box and embracing the extremities of the webs, and nuts on the ends of the axle-box, substantially as and for the purpose described.

In testimony that I claim the foregoing as my own I have hereto affixed my signature in the presence of two witnesses.

GUY SHERMAN.

Witnesses:
   ED. H. PERRY,
   JOHN CHARLTON.